UNITED STATES PATENT OFFICE.

WALTER ALEXANDER, OF NEW YORK, N. Y.

COATING PROCESS.

1,337,380. Specification of Letters Patent. Patented Apr. 20, 1920.

No Drawing. Application filed October 20, 1915. Serial No. 56,935.

*To all whom it may concern:*

Be it known that I, WALTER ALEXANDER, a citizen of the United States, residing in the borough of Manhattan, city, county, and State of New York, have invented certain new and useful Improvements in Coating Processes, of which the following is a specification.

This invention relates to processes for coating fabrics and materials and to decorative surfaces obtainable thereby, and is particularly directed to the production of surfaces having the sheen, luster and generally characteristic appearance of metal.

The present invention accordingly has for its object the production of applied decorative surfaces having the characteristics of metal-like coatings. Another object of the invention is to provide a process of the kind described which shall enable an operator to vary the metallic sheen and luster in various places upon the surface, and to produce at will a variety of gradated shades of color thereon. Another object of the invention is to provide a coated material having a decorative surface simulating metallic surfaces in great variety of finishes, and also adaptable to the production of many novel effects in imitation of tortoise-shell, iridescent glass, the polished grains of rare woods and the like, which shall not tarnish or fade on exposure. Other objects will be in part obvious and in part pointed out hereinafter.

In carrying out my process in its preferred form for the accomplishment of the above objects, I preferably employ as the surface upon which the coating is to be made a fibrous material such as cloth, or, a stiff paper, like wall paper. The paper is preliminarily treated by coating it on one or both sides, according to the use for which it is intended, with an adhesive substance and a compound of a base metal, which, like lead, copper, etc., is capable of readily forming sulfids on exposure to sulfur-bearing material. The adhesive may be of any desired character, but should offer no obstacle to the interaction between the compound of a base metal held therein and a sulfur-liberating body. I have found that dextrin is a suitable adhesive agent. The compound of the base metal may be one having a distinctly acid or basic nature, but I have found it preferable to employ a salt of a substantially neutral character, such as the combination of a base metal, for example, lead, copper, antimony, tin, mercury, etc., with one of the well-known acids forming salts with these metals soluble in water, such as nitric acid or acetic acid. It will of course be understood that I do not wish to limit myself to the particular base metals just given. I intend to be understood as including only those metals which oxidize upon exposure to air, namely, the base metals as distinguished from the noble metals. Of these base metals, I intend to be understood as including only those capable of forming water-soluble salts, and which readily form sulfids on exposure to sulfur-bearing compounds. It is preferable to employ the salts of the cheaper metals, and with them highly satisfactory results have been obtained. Among these I have found that lead acetate or commercial sugar of lead possesses properties which particularly lend themselves to the process.

It is to be understood that the described steps for the production of a particular surface constitute but one of the many processes therefor.

As an example of such process, and the proportions of substances usable in carrying out the same, I prepare a thin paste of dextrin and to it add a solution of lead acetate. The paste of dextrin may be made by mixing 50 parts of canary-colored tapioca dextrin with from 50 to 60 parts of water. In this mixture is dissolved 30 parts of sugar of lead, heat being employed if necessary to aid in the preparation.

The surface of the paper or other material is then coated with this mixture, the coating being carried on in any desired manner, either by machinery or by hand, and may be performed in connection with a roll or rolls of paper, forming then a substantially continuous process, or may be conducted with single strips. Where the paper is to be used as wall paper, for example, and a considerable area is to be embellished, it is sometimes preferable to place it on the walls untreated, and when so placed carry on the coating process with the adhesive and base metal salt in order that maximum uniformity in harmonious effect may be obtained by the employment of the processes hereafter set forth and to obviate the difficulty experienced in matching the designs in positioning successive strips of wall paper.

Before the coating of dextrin and lead acetate has dried, the treated paper is brought into contact with a sulfur-bearing substance, preferably into an atmosphere of sulfur-containing gas, such as ammonium sulfid, hydrogen sulfid, and the like, whereupon lead sulfid is formed according to known chemical reactions. Ammonium sulfid is preferably employed in view of the fact that it thus leaves only substantially neutral bodies upon the surface of the coating mass as a result of the reaction. The production of the sulfid may be controlled to give a wide variety of effects. This control is effected either by the dilution of the ammonium sulfid or other sulfid-bearing material employed in carrying out the process, or by varying the content of the metal or metallic salt in the coating composition or by otherwise altering their relationship, as by varying both. The dilution of ammonium sulfid may be effected by admitting more or less air into the gaseous atmosphere. By decreasing the proportion of sulfid-bearing material in the gaseous atmosphere or by increasing the proportion of metallic salt in the solution, or by varying the relative degree of excess of the salt, iridescent mottled effects are obtainable, whereas with relatively higher content of sulfid-bearing material, the surface produced increasingly tends to uniformity of color in correspondence with the decreasing percentage of metallic salt. It is to be understood that the ammonium sulfid or other sulfur-bearing material may be applied in any desired manner; for example, if the material is in gaseous form, it may be directed by the ordinary form of air brush made of a material not susceptible to the gas, and a design may be made on the preliminarily coated surface by passing the gas through suitable stencils. In making these designs, however, it has been found preferable to carry out the process by printing the coating material on the surface and subsequently treating with the sulfur-bearing material.

After treatment as indicated above and drying with the employment of heat if necessary, the surfaces may be varnished with a soluble cotton or other form of lacquer to give them a high finish and provide a protective coating. It will be noted that this coating of varnish is relatively thin compared with the thickness of varnish which would be employed where the coating medium, for example, bronze powder, pigment, and the like, is suspended in the lacquer substance, thus effecting a large saving in the use of such a substance.

The process may be carried out not only upon an untreated paper surface, as heretofore indicated, but may be conducted upon a colored or pigmented surface, the final iridescent coating being such that the pigment forms a backing and lends its color to that produced by the metallic precipitate.

Excellent results have been obtained in carrying out a process of this sort by treating red, blue, yellow, and other variously colored papers with lead and other compounds, and precipitating with sulfur material as heretofore, whereupon the tone of the resulting paper is darker than the original color and possesses a metallic sheen. By treating a paper with lamp black or a similar substance having the function of adding the quality of semi-opacity to a transparent or highly reflecting surface, and then carrying on the process as indicated, a dull surface is produced, resembling in some of its characteristics oxidized silver. Similarly, matted gold effects are producible. By reducing the quantity of lamp black or the like substance, increasing brilliance of surface is attained.

The finished material made according to the processes described possesses a metallic-appearing surface which is substantially permanent and not susceptible to various atmospheric agencies, such as sulfur fumes, carbon dioxid, etc. Of course, as noted, additional permanency, by applying lacquer or similar substance as a protective agent, may be obtained, and under these conditions the surface, if lustrous, acquires greater brilliance.

It will thus be seen that the objects above enumerated, among others, are achieved by this embodiment of the invention.

As various possible modifications of this invention may be made without departing from the spirit thereof, I do not desire to be limited to the specific embodiments here given except as indicated in the appended claims.

Having thus described my invention, I claim:

1. The process of producing a decorative coating having a metallic appearance upon a fibrous surface consisting in coating said surface with an adhesive solution of a water-soluble salt of a base metal capable of readily forming sulfids and causing a reaction between said salt and a sulfur-containing substance.

2. The process of producing a metal-like coating upon a fibrous surface which comprises treating said surface with a compound of an active base metal and bringing a sulfur-liberating body into contact therewith.

3. The process of producing a metal-like coating upon a fibrous surface which comprises treating said surface with a water-soluble salt of an active base metal and subjecting the so-treated surface to the vapor of a sulfur-containing agent.

4. The process of producing metal-like coatings upon fibrous surfaces which comprises treating said surfaces with an adhesive binder containing a salt of an active base metal capable of forming an insoluble sulfid and subjecting the surfaces so treated to a sulfur-liberating body.

5. The process of producing decorative coatings upon fibrous surfaces which comprises treating said surfaces with an adhesive solution of a soluble salt of an active base metal capable of readily forming sulfids and bringing a sulfur-liberating body into contact therewith while the solution is moist.

6. The process of producing metal-like coatings which comprises treating a surface with a liquid mixture of a salt of an active base metal with a binder, and while still moist bringing a sulfur-liberating body into contact therewith.

7. The process of producing decorative coatings which comprises treating a surface with an adhesive binder containing a salt of an active base metal capable of forming an insoluble sulfid, and while still moist bringing a sulfur-liberating body into contact therewith.

8. The process of producing metal-like coatings upon fibrous surfaces which comprises treating a surface with a solution of a base metal salt and a binder therefor, and while still moist bringing a sulfur-liberating body into contact therewith.

9. The process of producing metal-like coatings upon fibrous surfaces which comprises treating said surfaces with a compound comprising a base metal and acetic acid, and bringing a sulfur-liberating body into contact therewith.

10. The process of producing metal-like coatings upon a fabric surface which comprises treating such a surface with lead acetate, and bringing a sulfur-liberating body into contact therewith.

11. The process of producing metal-like coatings upon fibrous surfaces which comprises treating such a surface with a paste comprising an adhesive binder and a compound of an active base metal, and treating said surface with a sulfur-containing agent.

12. The process of producing metal-like coatings upon fibrous surfaces which comprises treating such a surface with a paste adapted to act as a binder and comprising a solution of a water-soluble salt of an active base metal capable of readily forming an insoluble sulfid, and while still moist bringing a sulfur-liberating body into contact therewith.

13. The process of producing decorative coatings which comprises treating a surface with a paste of dextrin and a water-soluble salt of an active base metal, and bringing a sulfur-liberating body into contact therewith.

14. The process of producing metal-like coatings which comprises treating a surface with a binder comprising dextrin, water and lead acetate, and bringing a sulfur-liberating body into contact therewith.

15. The process of producing metal-like coatings which comprises treating a surface with an active compound of a base metal, bringing a sulfur-liberating body into contact therewith, and applying a protective coating to the resultant surface.

16. The process of producing metal-like coatings which comprises treating a nonmetallic surface with a compound of an active base metal and bringing a gas containing sulfur into contact therewith.

17. The process of producing metal-like coatings which comprises treating a nonmetallic surface with a compound of an active base metal forming an insoluble sulfid, and bringing ammonium sulfid into contact therewith.

18. The process of producing metal-like coatings which comprises treating a nonmetallic surface with a solution of a lead salt and a binder therefor and bringing a sulfur-liberating body into contact therewith.

19. The process of producing metal-like coatings which comprises treating a surface with a substance comprising dextrin and a solution of lead acetate, and bringing ammonium sulfid into contact therewith.

20. The process of producing decorative coatings which comprises treating a surface with a suspension of a compound of a base metal adapted to form a sulfid in a liquid adhesive, bringing a sulfur-liberating body into contact therewith, and controlling the formation of the sulfid through regulation of the strength of the sulfur-liberating body.

21. The process of producing metal-like coatings which comprises treating a surface with a suspension of a compound of a base metal adapted to form a sulfid in a liquid adhesive, bringing a sulfur-liberating gas into contact therewith, and regulating the sulfid formation by diluting the gas.

22. The process of producing metal-like coatings which comprises treating a surface with a compound of an active base metal capable of readily forming an insoluble sulfid, and bringing ammonium sulfid diluted with air into contact therewith to control the precipitation of the sulfid and the consequent appearance of the surface.

23. The process of producing metal-like coatings which comprises treating a surface with a solution of a water-soluble salt of an active base metal, bringing a sulfur-liberating body into contact with the treated surface, and controlling the formation of the resultant sulfid through regulation of the proportion of metallic salt in the solution.

WALTER ALEXANDER.